United States Patent [19]

Fujita et al.

[11] Patent Number: 4,572,359
[45] Date of Patent: Feb. 25, 1986

[54] CONVEYOR BELT

[75] Inventors: Mamoru Fujita, Ayase; Yasuaki Kameta, Yokohama, both of Japan

[73] Assignee: Bridgestone Tire Company Limited, Tokyo, Japan

[21] Appl. No.: 594,614

[22] Filed: Mar. 29, 1984

[30] Foreign Application Priority Data

Apr. 11, 1983 [JP] Japan .................. 58-52580[U]

[51] Int. Cl.⁴ ............................... B65G 15/08
[52] U.S. Cl. ............................ 198/819; 198/847
[58] Field of Search .................. 198/847, 819, 846

[56] References Cited

U.S. PATENT DOCUMENTS 3,661,245 5/1972 Mol et al. .................. 198/847

FOREIGN PATENT DOCUMENTS 0050962 5/1982 European Pat. Off. ........... 198/819
2061853 5/1981 United Kingdom ............. 198/819

Primary Examiner—Joseph E. Valenza
Assistant Examiner—Darrell G. Dayoan
Attorney, Agent, or Firm—Sughrue, Mion, Zinn, Macpeak & Seas

[57] ABSTRACT

A conveyor belt is disclosed, which comprises an upper covering rubber layer, a lower covering rubber layer, and a core layer embedded between the upper and lower covering layers and is adapted for used in conveyance while being elastically deformed in such a cylindrical shape as to overlap the widthwise edge portions thereof with each other. In this type of the conveyor belt, a low friction layer is provided on each of both surfaces of the belt at the overlap portion.

5 Claims, 5 Drawing Figures

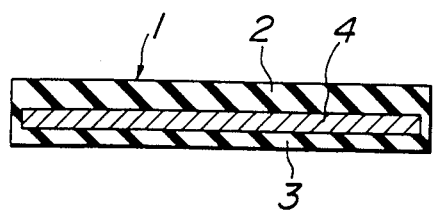
FIG._1
PRIOR ART
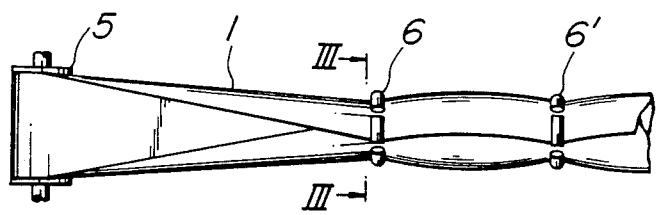
FIG._2
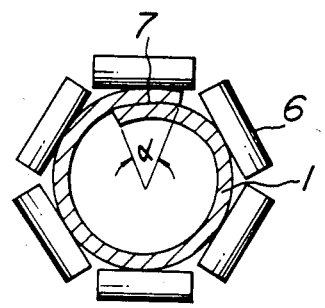
FIG._3

CONVEYOR BELT

BACKGROUND OF THE INVENTION (1) Field of the Invention

This invention relates to a conveyor belt, and more particularly to an improvement in a conveyor belt adapted to perform conveyance while being elastically deformed in such a cylindrical shape as to overlap both widthwise edge portions thereof with each other.

(2) Description of the Prior Art

As the conveyor belt of this type, there has been hitherto been used a belt as shown in FIG. 1. In this case, the belt 1 is constituted by upper and lower covering rubber layers 2 and 3 and a core layer 4 embedded therebetween.

As shown in a plan view of FIG. 2, the conveyor belt 1 is trained about a pulley 5 and is gradually deformed elastically in a cylindrical shape while being run from the pulley up to a belt-deforming roller 6 consisting, for instance, of six roll segments, which is arranged at a predetermined distance apart from the pulley.

As shown in an enlarged sectional view of FIG. 3, when the conveyor belt 1 reaches the belt-deforming roller 6, it is elastically deformed in such a cylindrical shape that the widthwise edge portions of the belt overlap with each other at a angle α of an overlap portion 7 of about 60°, by means of the six roll segments constituting the roller 6 and being disposed in a plane perpendicular to the belt-running direction. Such an elastically deformed shape of the conveyor belt is maintained by the action of a plurality of deformation-holding rollers 6 arranged at a predetermined interval in the belt-running direction until the material to be conveyed reaches a predetermined discharge position.

Moreover, the material to be conveyed such as powder materials, granular materials or the like is supplied onto the conveyor belt 1 between the pulley 5 and the belt-deforming roller 6 during the running of the belt.

However, according to such a prior art, the widthwise edge portions of the conveyor belt 1 are brought into rubber-contact with each other at the overlap portion 7, so that the frictional resistance between the upper and lower covering rubber layers 2, 3 at the overlap portion 7 is large. Therefore, large power is particularly required for elastically deforming the conveyor belt 1 in the cylindrical shape between the pulley 5 and the belt-deforming roller 6 or for squeezing the conveyor belt 1 swelled in a barrel-like shape between the two rollers 6, 6' as shown in FIG. 2 into the original cylindrical shape. In the worst case, a problem is created that the frictional resistance leading to the running resistance of the conveyer belt 1 grows up to about one third of the total running resistance.

SUMMARY OF THE INVENTION

The invention is to provide a conveyor belt which can advantageously solve the aforementioned problem of the prior art.

In the conveyor belt according to the invention, a low friction layer made of a material having a small friction coefficient is provided on each of the both surfaces of the conveyor belt at the overlap portion. That is, according to the invention, the frictional resistance at the overlap portion is reduced by means of these low friction layers, whereby the power for driving the conveyor belt and hence the strength of the conveyor belt can be reduced.

BRIEF DESCRIPTION OF THE DRAWINGS

The invention will be described in detail with reference to the accompanying drawing, wherein:

FIG. 1 is a sectional view of the conventional conveyor belt as mentioned above;

FIG. 2 is a sectional view illustrating the operational state of the conveyor belt;

FIG. 3 is a sectional view taken along a line III—III of FIG. 2;

DETAILED DESCRIPTION OF THE INVENTION

Figure 4:
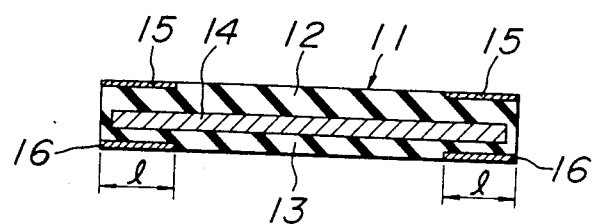
FIG. 4 is a sectional view of an embodiment of the conveyor belt according to the invention.

In FIG. 4 is sectionally shown an embodiment of the conveyor belt according to the invention, wherein numeral 11 is a conveyor belt, numerals 12 and 13 upper and lower covering rubber layers, numeral 14 a core layer embedded between the covering layers 12 and 13.

In this embodiment, low friction layers 15, 16 are bonded by adhesion or vulcanization to outer of surfaces of the widthwise edge portions of the upper and lower covering rubber layers 12, 13, respectively. As the low friction layers 15 and 16, use may be made of a canvas of cotton, vinylon, polyester, nylon or the like and polytetrafluoroethylene film (Teflon: tradename of Du Pont). Each of the low friction layers 15, 16 extends lengthwise over the entire length of each of the covering rubber layers 12, 13. The width l of each of the low friction layers 15 and 16 to be bonded is preferably designed as one seventh of that of the covering rubber layer when the overlapping angle is set, for instance, at about 60°, but even if the width l of the low friction layer is smaller than the above one seventh, the frictional force can be fully decreased as compared with the prior art.

In the conveyor belt of the above mentioned structure, as shown in FIG. 2, when the conveyor belt 11 is elastically deformed in a cylindrical shape between the pulley 5 and the roller 6, or when the barrel-like shape formed between the rollers 6, 6' or 6', 6 is squeezed again into the original cylindrical shape, the sliding with a less friction can be secured at the overlap portion 7 by the paired low friction layers 15 and 16 located at either widthwise edge portion of the belt. Thus, the running resistance caused by the frictional force at the overlap portion 7 can be extremely reduced.

In the illustrated embodiment, the surface of the low friction layers 15 and 16 is the same level as the surface at the central portion of the covering rubber layers 12 and 13, but if the low friction layers 15 and 16 can be secured to the covering rubber layer at a sufficient strength, there may be provided a stepwise difference between the covering rubber layer and the low friction layer as long as it causes no adverse influence upon the operation of the conveyor belt 11. Further, in this embodiment, the both widthwise edge portions of the covering rubber layers 12 and 13 are provided with the low friction layers 15 and 16, respectively, but if the overlapping direction of the conveyor belt 11 can be constantly specified, the low friction layers 15 and 16 may be attached only on either of the widthwise edge portions of the covering rubber layers 12 and 13 in such a way that the attached portions may be located in a diagonal relation on the belt in section in FIG. 4.

Figure 5:
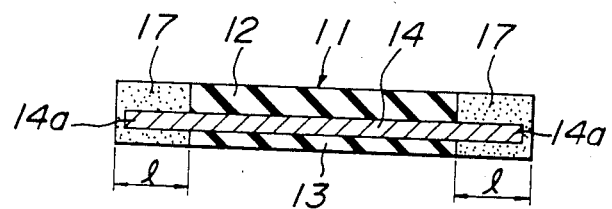
FIG. 5 is a sectional view of another embodiment of the conveyoer belt according to the invention.

FIG. 5 is a sectional view of another embodiment of the conveyor belt according to the invention. In this embodiment, the upper and lower covering rubber layers 12 and 13 are provided only on that portion of the conveyor belt 11 which takes place no overlapping during the elastic deformation into the cylindrical shape, and both side edge portions 14a of the core layer 14 projecting from the covering rubber layers 12 and 13 in the widthwise direction are embedded in the low friction layers 17 secured to the side surfaces of the covering rubber layers 12 and 13, respectively. As the low friction layer 17, use may be made of a porous material which allows the oozing-out of an oily matter onto the surface thereof. In this case, the low friction layer 17 which is located at the widthwise edge portions of the conveyor belt 11 over a predetermined width 1 serves to facilitate the sliding at the overlap portion 7 of the conveyor belt 11 with the oily matter.

Therefore, in this embodiment, the running resistance produced by the frictional force can also be conspicuously reduced.

Although it may be considered that the low friction layer 17 used in this embodiment is provided on only one of the widthwise edge portions of the conveyor belt 11, while the remaining other edge portion is designed as a widthwisely extended portion of the upper and lower covering rubber layers 12 and 13 so that the oily matter oozing out from the low friction layer 17 may facilitate the sliding at the overlap portion 7 between the extended portion and the low friction layer 17, it is preferable to provide a low friction layer 17 on each of the widthwise edge portions in order to reduce the running resistance during the conveyor belt to a large extent. This is applicable to the embodiment as described in connection with the embodiment in FIG. 4.

As apparent from the above, according to the invention, a smooth relative sliding displacement at the overlap portion is possible through the provision of the low friction layers on both surfaces of the widthwise edge portions of the conveyor belt at this overlap portion. Therefore, the running resistance of the conveyor belt resulted from the frictional resistance at the overlapping portion can be reduced considerably and consequently the power for driving the conveyor belt and hence the strength of the conveyor belt can be decreased as compared with those of the prior art.

What is claimed is:

1. A conveyor belt comprising; an upper covering rubber layer, a lower covering rubber layer, a core layer embedded between the upper and lower covering layers and adapted for use in conveyance while being elastically deformed in a substantially cylindrical shape to overlap surfaces of the widthwise edge portions thereof with each other and a low friction layer provided at least on each of surfaces the widthwise edge portions of the conveyor belt that overlap with each other.

2. A conveyor belt according to claim 1, wherein said low friction layer is made of a material having a small friction coefficient selected from the group consisting of a canvas of cotton, vinylon, polyester or nylon, a polytetrafluoroethylene film and a porous material which allows oozing-out of an oily matter therefrom.

3. A conveyor belt according to claim 1, wherein said low friction layer is bonded to each outer surface of both widthwise edge portions of the upper and lower covering rubber layers.

4. A conveyor belt according to claim 1, wherein said low friction layer is secured to each side surface of said upper and lower covering rubber layers, and each edge portion of said core layer projecting from said covering rubber layers in the widthwise direction is embedded in said low friction layer.

5. A conveyor belt according to claim 1, wherein a width of said overlap portion is not more than one seventh of the width of the belt.

* * * * *